US012743790B2

(12) United States Patent
Han et al.

(10) Patent No.: US 12,743,790 B2
(45) Date of Patent: Sep. 22, 2026

(54) METHOD FOR MEASURING CHANNEL FLOW BASED ON BIONIC EAGLE-EYE VISION AND APPARATUS THEREOF

(71) Applicant: China Agricultural University, Beijing (CN)

(72) Inventors: Yu Han, Beijing (CN); Hairong Gao, Beijing (CN); Zihan Liu, Beijing (CN); Zihao Lou, Beijing (CN)

(73) Assignee: China Agricultural University, Beijing (CN)

( * ) Notice: Subject to any disclaimer, the term of this patent is extended or adjusted under 35 U.S.C. 154(b) by 0 days.

(21) Appl. No.: 19/181,825

(22) Filed: Apr. 17, 2025

(65) Prior Publication Data

US 2025/0371718 A1 Dec. 4, 2025

(30) Foreign Application Priority Data

May 31, 2024 (CN) ......................... 202410701616.5

(51) Int. Cl.
*G06T 7/246* (2017.01)
*G01C 13/00* (2006.01)
(Continued)

(52) U.S. Cl.
CPC ............ *G06T 7/246* (2017.01); *G01C 13/006* (2013.01); *G06T 7/194* (2017.01); *G06T 7/73* (2017.01);
(Continued)

(58) Field of Classification Search
CPC ........ G01C 13/006; G06T 2207/10016; G06T 2207/20081; G06T 2207/20084; G06T 2207/30181; G06T 7/194; G06T 7/246; G06T 7/269; G06T 7/73; G06V 10/774; G06V 10/806; G06V 10/82; G06V 20/182; G06V 20/46
See application file for complete search history.

(56) References Cited

U.S. PATENT DOCUMENTS

2023/0195979 A1* 6/2023 Fang ....................... G06F 30/20 703/9

FOREIGN PATENT DOCUMENTS

CN 113819974 * 7/2022 ........... G06F 18/241
CN 116843725 * 10/2023 ................ G01P 5/26
(Continued)

*Primary Examiner* — Zhiyu Lu

(74) *Attorney, Agent, or Firm* — Thomas | Horstemeyer, LLP

(57) ABSTRACT

A method for measuring channel flow based on bionic eagle-eye vision and an apparatus thereof are provided. The method includes: acquiring a channel flowing video, and carrying out image frame interval extraction on the channel flowing video to obtain a target observation image; calculating an optical flow value of the target observation image, and calculating a surface flow velocity value of the target observation image in a world coordinate system based on position change information of the optical flow value of the target observation image between image frames and a spatial resolution of the target observation image; acquiring an average cross-section flow velocity based on a pre-trained surface cross-section flow velocity coupling model, and calculating the channel flow based on the average cross-section flow velocity and a cross-section water level value.

19 Claims, 9 Drawing Sheets

(51) Int. Cl.

| | |
|---|---|
| ***G06T 7/194*** | (2017.01) |
| ***G06T 7/73*** | (2017.01) |
| ***G06V 10/774*** | (2022.01) |
| ***G06V 10/80*** | (2022.01) |
| ***G06V 10/82*** | (2022.01) |
| ***G06V 20/10*** | (2022.01) |
| ***G06V 20/40*** | (2022.01) |

(52) U.S. Cl.

CPC .......... *G06V 10/774* (2022.01); *G06V 10/806* (2022.01); *G06V 10/82* (2022.01); *G06V 20/182* (2022.01); *G06V 20/46* (2022.01); *G06T 2207/10016* (2013.01); *G06T 2207/20081* (2013.01); *G06T 2207/20084* (2013.01); *G06T 2207/30181* (2013.01)

(56) References Cited

FOREIGN PATENT DOCUMENTS

| | | | | |
|---|---|---|---|---|
| CN | 117288283 | * | 12/2023 | ........... G01F 1/7086 |
| CN | 117346846 | * | 6/2024 | ........... G06N 3/0464 |
| EP | 2034278 | * | 5/2016 | ........... G01F 1/7086 |
| JP | 2023059460 | * | 4/2023 | ............. Y02A 90/30 |
| JP | 2023141574 | * | 10/2023 | ................ G01P 5/20 |
| JP | 2025165585 | * | 11/2025 | ................ G01P 5/20 |
| KR | 101996992 | * | 7/2019 | ............. G06F 17/16 |
| KR | 20220074347 | * | 6/2022 | ............. B64U 20/87 |
| KR | 20240030259 | * | 3/2024 | ................ G01P 5/20 |
| WO | WO0151897 | * | 7/2001 | ............. G01F 1/712 |

* cited by examiner

FIG. 1

METHOD FOR MEASURING CHANNEL FLOW BASED ON BIONIC EAGLE-EYE VISION AND APPARATUS THEREOF

CROSS-REFERENCE TO RELATED PRESENT DISCLOSURE

This patent application claims the benefit and priority of Chinese Patent Application No. CN202410701616.5 filed with the China National Intellectual Property Administration on May 31, 2024, the disclosure of which is incorporated by reference herein in its entirety as part of the application.

TECHNICAL FIELD

The present disclosure relates to the technical field of channel flow measurement, and in particular to a method for measuring channel flow based on bionic eagle-eye vision and an apparatus thereof.

BACKGROUND

Food safety is the basic guarantee of national security, and water safety serves as the foundation of food safety. Monitoring channel flow is the key to quantitative management of water resources. Real-time and online monitoring of channel flow enables us to understand the water consumption in irrigation areas in real time, which is of great significance for water use and water diversion control and is convenient for the overall management of irrigation areas.

At present, water measurement measures are mainly divided into five major categories, including flow measurement by structure, such as flow measurement using current meters, flow measurement with a standard cross-section, flow measurement through sluice gates, and flow measurement through inverted siphons, flow measurement using weir notches such as Parshall flumes and measuring sills, and flow measurement with instruments such as the water level and the flow. However, due to the gap between the actual situation and theoretical conditions of structure, flow deviations are likely to occur. Meanwhile, the equipment for flow measurement by structure has a high construction cost and a high later maintenance cost. Additionally, there are requirements for the flow pattern during flow measurement. The existing non-contact flow measurement methods may be affected by factors such as weather, temperature, objects in rivers, and water quality, which may affect the measurement accuracy and lead to inaccurate data.

How to improve the measurement accuracy of channel flow is a technical problem that needs to be solved at present.

SUMMARY

The present disclosure provides a method for measuring channel flow based on bionic eagle-eye vision and an apparatus thereof, which are used for solving the defects in the prior art.

The present disclosure provides a method for measuring channel flow based on bionic eagle-eye vision, including:

acquiring a channel flowing video, and carrying out image frame interval extraction on the channel flowing video to obtain a target observation image;

calculating an optical flow value of the target observation image, and calculating a surface flow velocity value of the target observation image in a world coordinate system based on position change information of the optical flow value of the target observation image between image frames and a spatial resolution of the target observation image, wherein the position change information is used for indicating a change of a pixel point in the target observation image in a time domain; and acquiring an average cross-section flow velocity based on a pre-trained surface cross-section flow velocity coupling model, and calculating the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance.

According to the method for measuring channel flow based on bionic eagle-eye vision provided by the present disclosure, the carrying out image frame interval extraction on the channel flowing video to obtain a target observation image includes:

carrying out the image frame interval extraction and image enhancement preprocessing on the channel flowing video to obtain an initial observation image; and carrying out background segmentation processing on the initial observation image to obtain the target observation image.

According to the method for measuring channel flow based on bionic eagle-eye vision provided by the present disclosure, the calculating an optical flow value of the target observation image, and calculating a surface flow velocity value of the target observation image in a world coordinate system based on position change information of the optical flow value of the target observation image between image frames and a spatial resolution of the target observation image, includes:

calculating the optical flow value of the target observation image, and calculating a surface flow velocity value of the target observation image in a pixel coordinate system based on the position change information of the optical flow value of the target observation image between the image frames; and calculating the surface flow velocity value of the target observation image in the world coordinate system based on the spatial resolution of the target observation image and the surface flow velocity value of the target observation image in the pixel coordinate system.

According to the method for measuring channel flow based on bionic eagle-eye vision provided by the present disclosure, the method further includes: before the acquiring an average cross-section flow velocity based on a pre-trained surface cross-section flow velocity coupling model, determining an optimal frame image and a reference line position in the target observation image based on the surface flow velocity value in the world coordinate system; obtaining a local channel flow field based on the optimal frame image and the reference line position, and carrying out flow velocity fitting on the local channel flow field to obtain a flow velocity distribution formula.

According to the method for measuring channel flow based on bionic eagle-eye vision provided by the present disclosure, the acquiring an average cross-section flow velocity based on a pre-trained surface cross-section flow velocity coupling model includes:

determining a plurality of target normal points based on the reference line position, and segmenting a channel using a plurality of vertical lines where the plurality of target normal points are located as axes of symmetry of a segmenting plane; and calculating an average flow velocity for each vertical line based on the surface cross-section flow velocity coupling model, and carrying out calculation on the average flow velocity for each vertical line by using a weighted average method to obtain the average cross-section flow velocity.

According to the method for measuring channel flow based on bionic eagle-eye vision provided by the present disclosure, the method further includes: before the calculating the channel flow based on the average cross-section flow velocity and a cross-section water level value, acquiring a historical water area shoreline video, and splicing and integrating images extracted from the historical water area shoreline video to obtain a historical water area shoreline image; and training a bionic eagle-eye vision model through the historical water area shoreline image to obtain a water level identification model; wherein the water level identification model includes a backbone network and a neck network, the backbone network is configured to extract feature information in the water area shoreline image and provide the feature information to the neck network, and the neck network is configured to carry out feature fusion on the feature information.

According to the method for measuring channel flow based on bionic eagle-eye vision provided by the present disclosure, the method further includes: before the calculating the channel flow based on the average cross-section flow velocity and a cross-section water level value, acquiring a water area shoreline video, and inputting the water area shoreline video into the water level identification model to obtain the cross-section water level value.

The present disclosure further provides an apparatus for measuring channel flow based on bionic eagle-eye vision, including:

an extraction module, configured to acquire a channel flowing video, and carry out image frame interval extraction on the channel flowing video to obtain a target observation image;

a first calculation module, configured to calculate an optical flow value of the target observation image, and calculate a surface flow velocity value of the target observation image in a world coordinate system based on position change information of the optical flow value of the target observation image between image frames and a spatial resolution of the target observation image; wherein the position change information is used for indicating a change of a pixel point in the target observation image in a time domain; and a second calculation module, configured to acquire an average cross-section flow velocity based on a pre-trained surface cross-section flow velocity coupling model, and calculate the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance.

The present disclosure further provides an electronic device, including a memory, a processor, and a computer program stored in the memory and executable on the processor, wherein the processor, when executing the program, implements the method for measuring channel flow based on bionic eagle-eye vision described above.

The present disclosure further provides a non-transient computer-readable storage medium on which a computer program is stored, wherein the computer program, when executed by a processor, implements the method for measuring channel flow based on bionic eagle-eye vision described above.

The present disclosure further provides a computer program product, including a computer program, wherein the computer program, when executed by a processor, implements the method for measuring channel flow based on bionic eagle-eye vision described above.

The present disclosure provides a method for measuring channel flow based on bionic eagle-eye vision and an apparatus thereof. The method includes: acquiring a channel flowing video, and carrying out image frame interval extraction on the channel flowing video to obtain a target observation image; calculating an optical flow value of the target observation image, and calculating a surface flow velocity value of the target observation image in a world coordinate system based on position change information of the optical flow value of the target observation image between image frames and a spatial resolution of the target observation image; wherein the position change information is used for indicating the change of a pixel point in the target observation image in a time domain; acquiring an average cross-section flow velocity based on a pre-trained surface cross-section flow velocity coupling model, and calculating the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance. Therefore, according to the present disclosure, the local channel flowing video is collected to infer the global area, so as to acquire the average cross-section flow velocity. Moreover, the channel flow is calculated according to the average cross-section flow velocity. The method is simple and the measurement accuracy is high.

BRIEF DESCRIPTION OF THE DRAWINGS

In order to explain the technical scheme of the present disclosure or the prior art more clearly, the drawings needed in the description of the embodiments or the prior art will be briefly introduced hereinafter. Obviously, the drawings in the following description are some embodiments of the present disclosure, and other drawings can be obtained according to these drawings without paying creative labor for those skilled in the art.

FIG. 1 is a schematic flow chart of a method for measuring channel flow based on bionic eagle-eye vision according to the present disclosure.

DETAILED DESCRIPTION OF THE EMBODIMENTS

In order to make the purpose, the technical scheme and the advantages of the present disclosure more clear, the technical scheme in the present disclosure will be described clearly and completely with reference to the attached drawings hereinafter. Obviously, the described embodiments are some embodiments of the present disclosure, rather than all of the embodiments. Based on the embodiments in the present disclosure, all other embodiments obtained by those skilled in the art without paying creative labor belong to the scope of protection of the present disclosure.

Hereinafter, a method and an apparatus for measuring channel flow based on bionic eagle-eye vision according to the present disclosure will be described with reference to FIG. 1 to FIG. 14.

Figure 1:
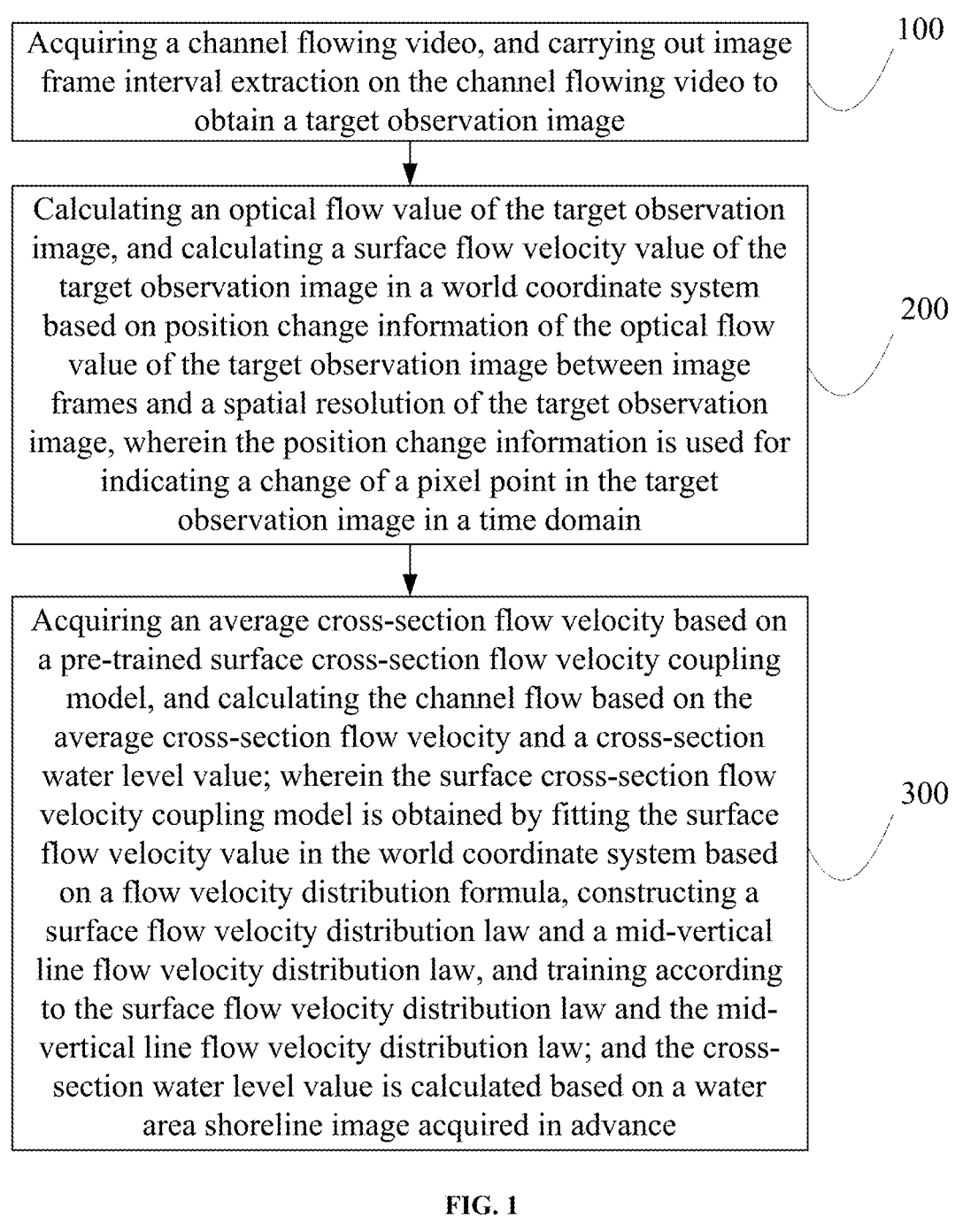

FIG. 1 is a schematic flow chart of a method for measuring channel flow based on bionic eagle-eye vision according to this embodiment. As shown in FIG. 1, the method for measuring channel flow based on bionic eagle-eye vision according to this embodiment includes steps 100-300.

In step 100, a channel flowing video is acquired, and image frame interval extraction is carried out on the channel flowing video to obtain a target observation image.

Figure 2:
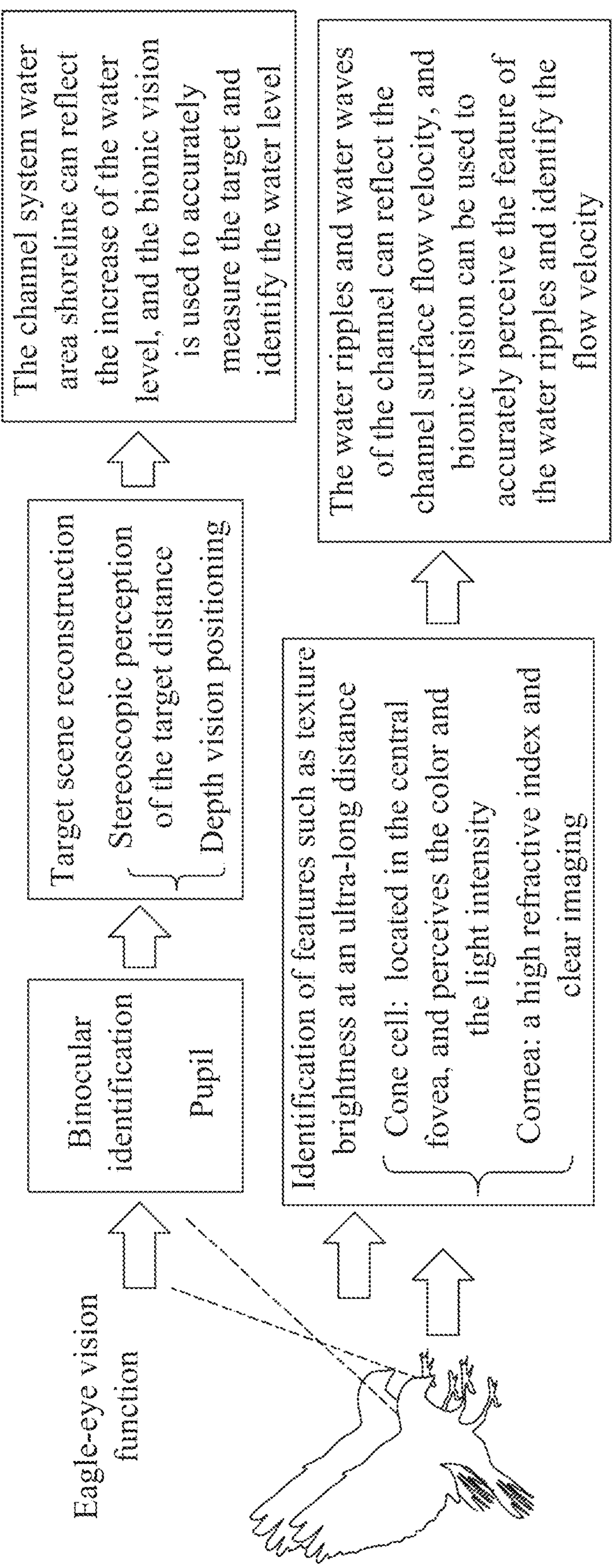
FIG. 2 is a schematic diagram of a bionic eagle-eye vision function according to the present disclosure.

It should be noted that at the same time, human eyes can only pay attention to a small part of the field of vision. In the case of distraction, an eagle can quickly find a plurality of targets, and use its own vision advantages to lock the targets at an ultra-long distance and estimate the distance for hunting. FIG. 2 is a schematic diagram of a bionic eagle-eye vision function according to this embodiment. As shown in FIG. 2, in this embodiment, a camera simulates the central fovea structure on the eagle-eye side to collect video images, and the collected channel flowing video is a local video of the channel.

Specifically, step 100 includes steps 110-120.

In step 110, image frame interval extraction and image enhancement preprocessing are carried out on the channel flowing video to obtain an initial observation image.

In step 120, background segmentation processing is carried out on the initial observation image to obtain the target observation image.

Figure 3:
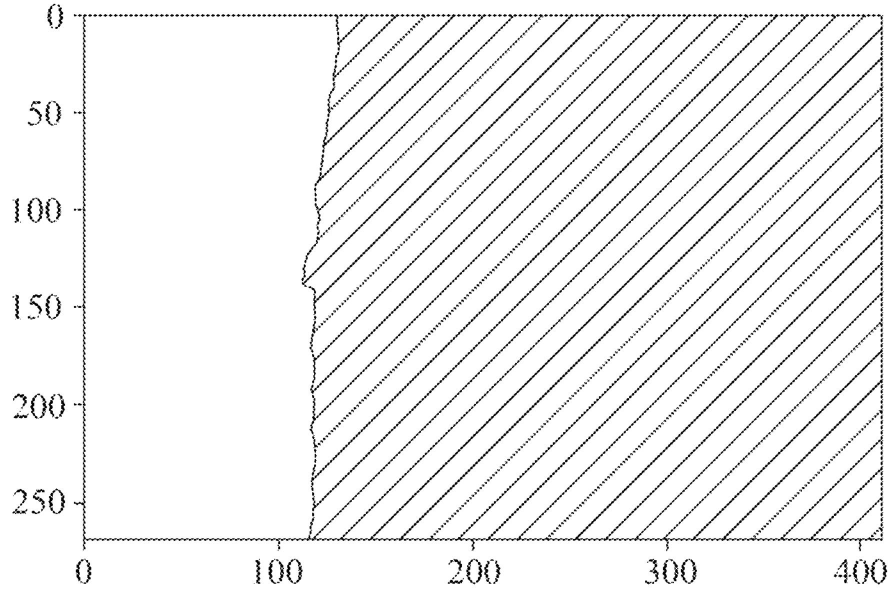
FIG. 3 is a schematic diagram of frame image segmentation for channel video flow measurement according to the present disclosure.

In one embodiment, a monocular camera is used to collect the local video of the channel surface flow, and the collected local video of the channel is preprocessed to generate a data set. The frame image extraction is carried out on the local video of the channel obtained above, and image enhancement processing such as denoising is carried out on the extracted image. At the same time, background segmentation is carried out on the channel water flow and the background in the image. FIG. 3 is a schematic diagram of frame image segmentation for channel video flow measurement according to this embodiment. As shown in FIG. 3, for each frame image, the channel water flow is separated from the background through a dynamic threshold. Because the water flow pixels in the channel are different from the background pixels, the image pixels are divided into several categories by setting different feature thresholds, and various parts of the image are segmented by a set of thresholds related to the pixel position (that is, the threshold is a function of coordinates).

In step 200, an optical flow value of the target observation image is calculated, and a surface flow velocity value of the target observation image in a world coordinate system is calculated based on position change information of the optical flow value of the target observation image between image frames and a spatial resolution of the target observation image; wherein the position change information is used for indicating the change of a pixel point in the target observation image in a time domain.

Specifically, step 200 includes steps 210-220.

In step 210, an optical flow value of the target observation image is calculated, and a surface flow velocity value of the target observation image in a pixel coordinate system is calculated based on position change information of the optical flow value of the target observation image between the image frames.

In step 220, a surface flow velocity value of the target observation image in a world coordinate system is calculated based on a spatial resolution of the target observation image and a surface flow velocity value of the target observation image in a pixel coordinate system.

In one embodiment, the optical flow method is used to measure the surface flow of the channel. The flow velocity is measured by detecting the optical flow of all points in the target observation image and using the movement of the optical flow points between the surface frame image and the second frame image. First, a Gaussian pyramid is established for each frame of the image, in which the lowest-resolution image is at the very top layer and the original image is at the bottom layer. The optical flow on the image at the very top layer of the pyramid is calculated from the top layer. Thereafter, the initial value of the optical flow at the second top layer is estimated according to the calculation result of the optical flow at the very top layer (Lm-1), and then the accurate value of the optical flow on the image at the second top layer is calculated. Finally, the initial value of the optical flow of the next layer (Lm-2) is estimated according to the calculation result of the optical flow at the second top layer, and the accurate value is calculated and is then fed back to the next layer until the optical flow of the original image at the bottom layer is calculated.

The optical flow method is used to calculate the optical flow value of the target observation image. The flow velocity is calculated according to the movement of the optical flow value of the flow measurement image between image frames, and then the flow velocity value u in the pixel coordinate system is obtained. After that, the pixel coordinate conversion is carried out. First, each frame image in the collected data set is converted into the hsv format to calculate the flow velocity. The flow velocity measured by the optical flow method is converted through angles and pixels. Thereafter, the real flow velocity of test points of the channel in the world coordinates is selected. The spatial conversion rate of the image is calculated by using the flow velocity measured by the optical flow method and the flow velocity in the world coordinates. The surface flow velocity value of the channel in the pixel coordinate system is converted into the surface flow velocity value of the channel in the world coordinate system by using the spatial conversion rate of the image. The hsv format is converted into the bgr format to display the surface flow velocity value.

In step 300, an average cross-section flow velocity is acquired based on a pre-trained surface cross-section flow velocity coupling model, and the channel flow is calculated based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance.

It should be noted that prior to step 300, the method further includes:

- determining an optimal frame image and a reference line position in the target observation image based on the surface flow velocity value;
- obtaining a local channel flow field based on the optimal frame image and the reference line position, and carrying out flow velocity fitting on the local channel flow field to obtain a flow velocity distribution formula.

Specifically, the optimal frame image and the reference line position are extracted from all surface flow velocity values in the world coordinate system by the formula, and the calculation formula is as follows:

$$y = ax + b$$

where $$a = \frac{\text{Optical flow point end array} - \text{Optical flow point start array}}{\text{Last bit array of real position coordinates} - \text{start bit array}},$$

b=Optical flow point start array−a*start bit array of the real position, x is the real point position, and y is the predicted point position.

It should be noted that due to different widths of different channels, the camera has a limited acquisition rang, and it is difficult to acquire the global flow field. Therefore, the local video flow field is output according to the above-mentioned optimal frame image and the reference line position. The flow velocity distribution model is obtained by flow velocity fitting on the local video flow field, and the global flow field is calculated according to the symmetry of the channel.

For wide and shallow channels, the mid-vertical line flow velocity distribution formula is the same as the flow velocity distribution formula obtained by surface flow velocity fitting. The flow velocity distribution formula is as follows:

$$u = C\ln y + D$$

where C is $Au_*$, and D is $$u_* A\ln\left(\frac{u_{*s}}{\gamma}\right) + Bu_*.$$

A and B are correlation coefficients; $u_*$ is a friction flow velocity; $u_{*s}$ is a local friction flow velocity; $\gamma$ is a kinetic viscosity coefficient of water; and y is the distance from each point on the vertical line in the channel to the side wall.

According to a large number of experimental results, the values of correlation coefficients A and B can be determined.

Specifically, in step 300, acquiring an average cross-section flow velocity based on a pre-trained surface cross-section flow velocity coupling model includes steps 310-320. In step 310, a plurality of target normal points are determined based on the reference line position, and a channel is segmented using a plurality of vertical lines where the plurality of target normal points are located as axes of symmetry of a segmenting plane.

In step 320, an average flow velocity for each vertical line is calculated based on the surface cross-section flow velocity coupling model, and calculation is carried out on the average flow velocity for each vertical line by using a weighted average method to obtain the average cross-section flow velocity.

Figure 4:
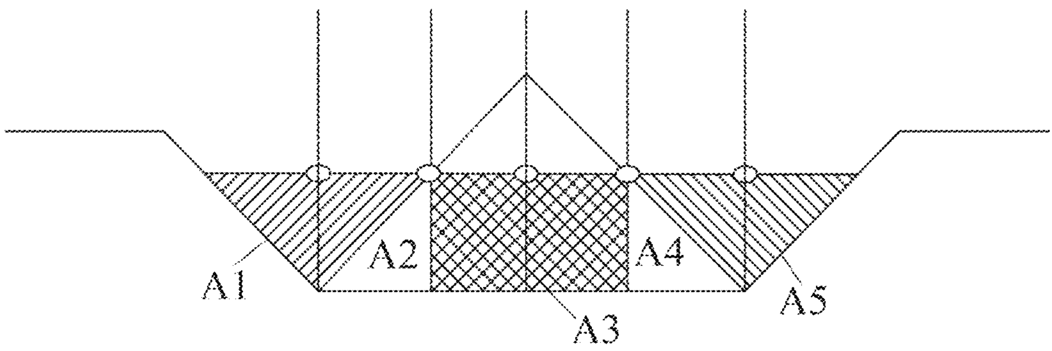
FIG. 4 is a schematic diagram of normal and area segmentation of selected points on a channel cross-section according to the present disclosure.

It should be noted that since the average flow velocity of the channel mid-vertical line cross-section is equal to the average flow velocity from the center point to the side wall, the channel flow velocity distribution formula obtained from the reference line position is the same as the flow velocity distribution formula of the cross-section mid-vertical line position. Therefore, the surface cross-section flow velocity coupling model is established. Thereafter the normal points are selected according to the reference line position. The measuring channel is a symmetrical channel. The global flow velocity is calculated by using the above flow velocity distribution formula to select the normal points. FIG. 4 is a schematic diagram of normal and area segmentation of selected points on a channel cross-section according to this embodiment. The five normal point positions shown in FIG. 4 are selected to output the flow velocity of the point.

Figure 5:
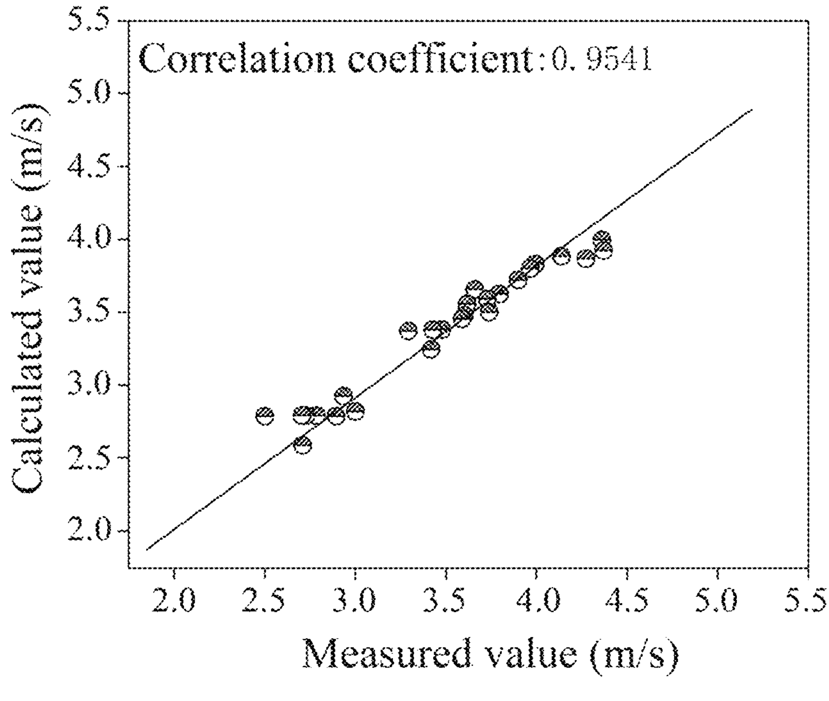
FIG. 5 is a schematic diagram of the comparison between a channel optical flow value velocity and a measured velocity according to the present disclosure.
Figure 6:
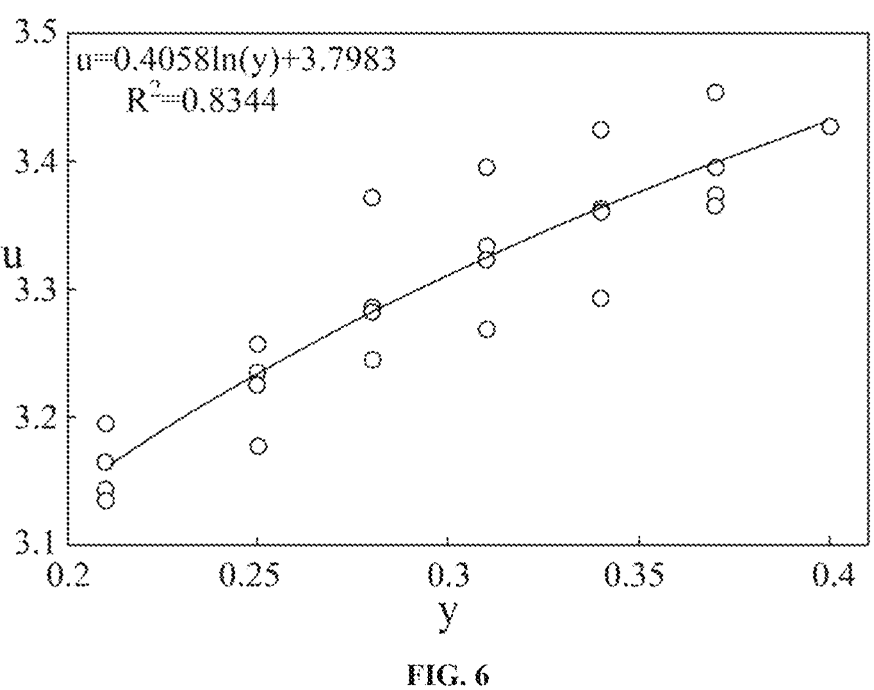
FIG. 6 is a schematic diagram of the comparison between a measured value and a calculated value of a cross-section mid-vertical line flow velocity according to the present disclosure.
Figure 7:
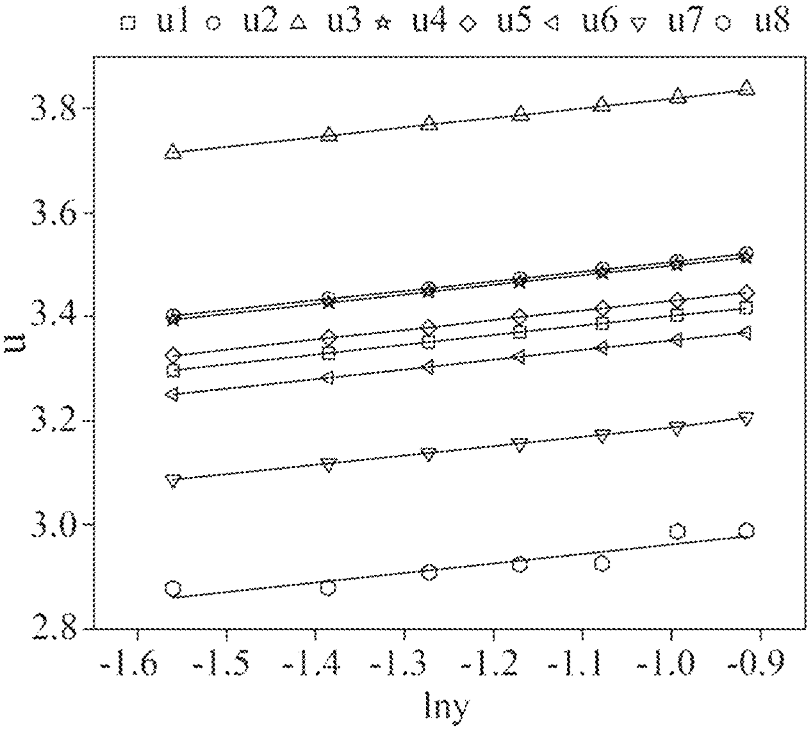
FIG. 7 is a schematic diagram of a flow velocity distribution formula of each normal line of a cross-section according to the present disclosure.
Figure 8:
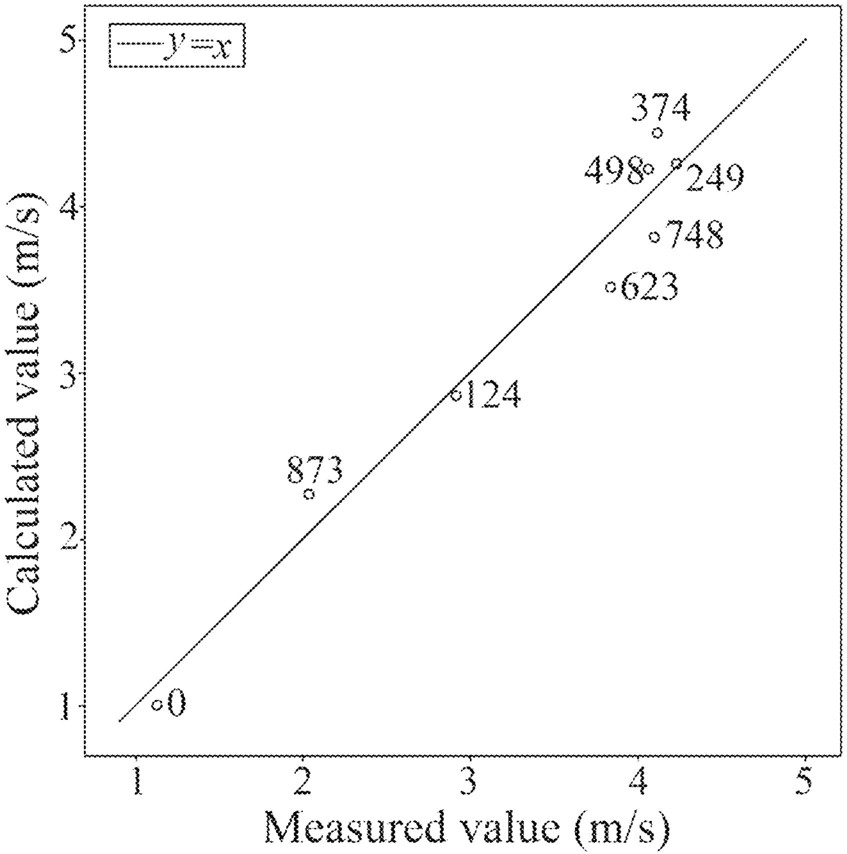
FIG. 8 is a schematic diagram of the comparison between a predicted flow velocity of a reference line of an optical flow method and a real position flow velocity according to the present disclosure.
Figure 9:
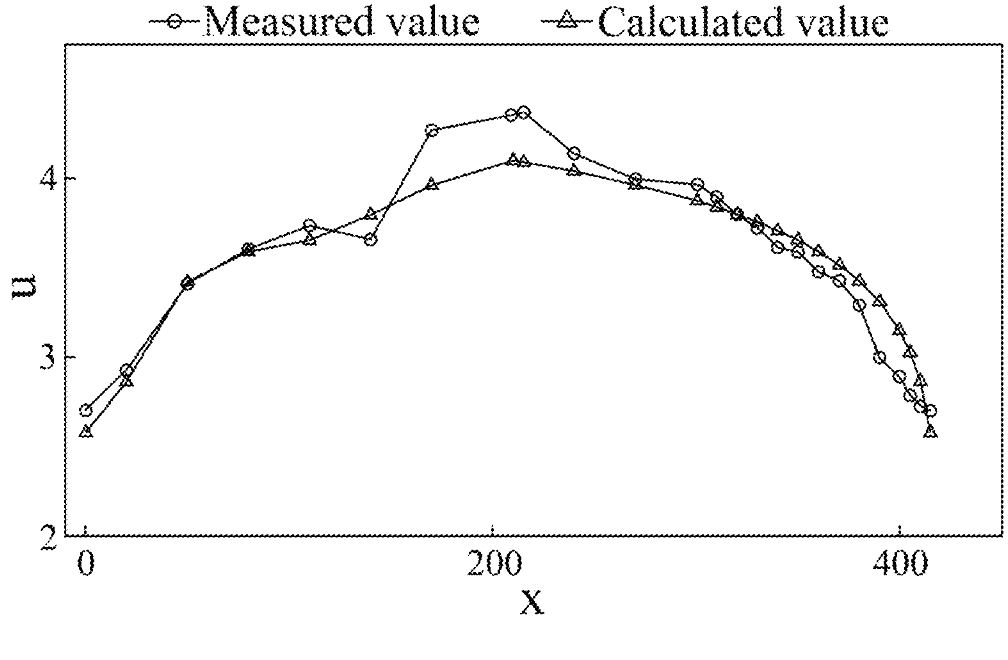
FIG. 9 is a schematic diagram of the comparison between a global reference line flow velocity measured by an optical flow method and a true value flow velocity according to the present disclosure.

FIG. 5 is a schematic diagram of the comparison between a channel optical flow value velocity and a measured velocity according to this embodiment. FIG. 6 is a schematic diagram of the comparison between a measured value and a calculated value of a cross-section mid-vertical line flow velocity according to this embodiment. FIG. 7 is a schematic diagram of a flow velocity distribution formula of each normal line of a cross-section according to this embodiment. FIG. 8 is a schematic diagram of the comparison between a predicted flow velocity of a reference line of an optical flow method and a real position flow velocity according to this embodiment. FIG. 9 is a schematic diagram of the comparison between a global reference line flow velocity measured by an optical flow method and a true value flow velocity according to this embodiment. With reference to FIG. 5 to FIG. 9, this embodiment will further explain how to acquire the flow velocity of the whole flow field on the surface of the water body and acquire the average cross-section flow velocity based on the optical flow method. Because there are the same slope and different intercepts in the vertical lines of the channel cross-section, the vertical line flow velocity distribution formula at the selected normal point can be calculated according to the established surface cross-section flow velocity coupling model. Thereafter, the selected normal points are used to segment the cross-section area of the channel, and the channel flow information is obtained based on a velocity-area method. Specifically, a channel is segmented using the vertical lines where the selected normal points are located as the axes of symmetry of the segmenting plane. The channel is determined to be divided into five partitions, and the flow is calculated to acquire the channel flow information.

Further, the weighted average method is used to calculate the average cross-section flow velocity, and the calculation formula is as follows:

$$\bar{V} = \frac{u_1 n_1 + u_2 n_2 + u_3 n_3 + \ldots + u_k n_k}{\sum_{i=1}^{k} n_i}$$

where u is the average flow velocity for each vertical line, and n is the weight of the selected mid-vertical line, and k is the number of vertical lines.

It should be noted that in step 300, prior to calculating the channel flow based on the average cross-section flow velocity and a cross-section water level value, the method further includes:

acquiring a historical water area shoreline video, and splicing and integrating images extracted from the historical water area shoreline video to obtain a historical water area shoreline image; and training a bionic eagle-eye vision model through the historical water area shoreline image to obtain a water level identification model; wherein the water level identification model includes a backbone network and a neck network, the backbone network is configured to extract feature information in the water area shoreline image and provide the feature information to the neck network, and the neck network is configured to carry out feature fusion on the feature information.

In the specific implementation process, a water area shoreline video is acquired, and the water area shoreline video is input into the water level identification model to obtain the cross-section water level value.

Figure 10:
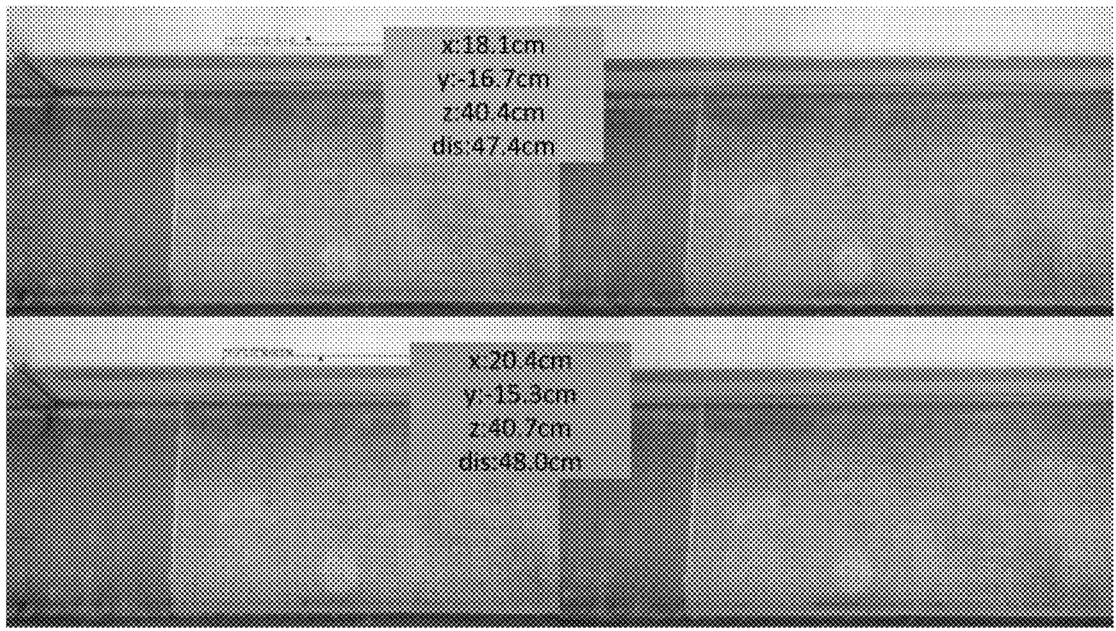
FIG. 10 is a picture showing water level lines identified by a water level identification model according to the present disclosure.

In one embodiment, the left front side view image and the right front side view image of the eagle eye formed by a binocular camera are spliced and integrated, and the binocular camera is used to simulate the central fovea structure of the eagle eye. Based on this, the image data set having 2,500 images are acquired, of which 2,000 are randomly selected as a training image set and 500 as a test image set and a verification image set. The images in the training set are converted to Pascal VOC (Visual Object Class) format. The length of the training image set is readjusted to 500 pixels, and the width is adjusted accordingly to keep the original aspect ratio when creating the training set. After numbering the images, Labelme software, which is an image labeling tool, is used to manually label the images. A bounding box is drawn, and categories are manually classified. Positive samples with insufficient or unclear pixel areas are not labelled to prevent over-fitting in deep learning. According to the bionic eagle-eye vision model, the You Only Look Once (YOLO) water level identification model is established, which mainly includes a Backbone network and a Neck network. The Backbone network is mainly used to extract the information in the picture and provide the information to the Neck network, which consists of a Conv module, a C2f module and a Spatial Pyramid Pooling-Fast (SPPF) module. The Neck network mainly carries out feature fusion and processes the features extracted from the backbone network. The water area shoreline image data set is input for training and verification, and a high-accuracy water area shoreline weight file is acquired by increasing the number of model training iterations. According to the Point Cloud Net (PCN) parallax principle, the distance c between the binocular camera and the water area shoreline is obtained. FIG. 10 is a picture showing water level lines identified by a water level identification model according to this embodiment, in which x is the position of a point on the water level line in the horizontal direction, y is the position of the point on the water level line in the vertical direction, z is the position of the point on the water level line in the depth direction, and dis is the straight line distance from the water level line to the camera. As shown in FIG. 10, according to the cosine theorem, the vertical distance between the binocular camera and the water area shoreline is $a=c\times\cos\alpha$, and the water level value of the channel system is $h=m-a$, where $\alpha$ is the installation angle of the binocular camera, and m is the distance between the binocular camera and the bottom of the channel.

Further, the channel flow is calculated by the following formula:

$$Q = \bar{V}_1 \cdot A_1 + \bar{V}_2 \cdot A_2 + \bar{V}_3 \cdot A_3 + \bar{V}_4 \cdot A_4 + \bar{V}_5 \cdot A_5$$

where $\nabla$ is the average cross-section flow velocity, A is the cross-section area which is h*w, and w is the channel width. $\nabla_1$ is the average flow velocity of each point on a first normal (that is, normal 1 in FIG. 4); $\nabla_2$ is the average flow velocity of each point on a second normal (that is, normal 2 in FIG. 4); $\nabla_3$ is the average flow velocity of each point on a third normal (that is, normal 3 in FIG. 4); $\nabla_4$ is the average flow velocity of each point on a fourth normal (that is, normal 4 in FIG. 4); $\nabla_5$ is the average flow velocity of each point on a fifth normal (that is, normal 5 in FIG. 4); in which $A_1$, $A_2$, $A_3$, $A_4$, and $A_5$ are the areas of the several partitioned polygons.

Figure 11:
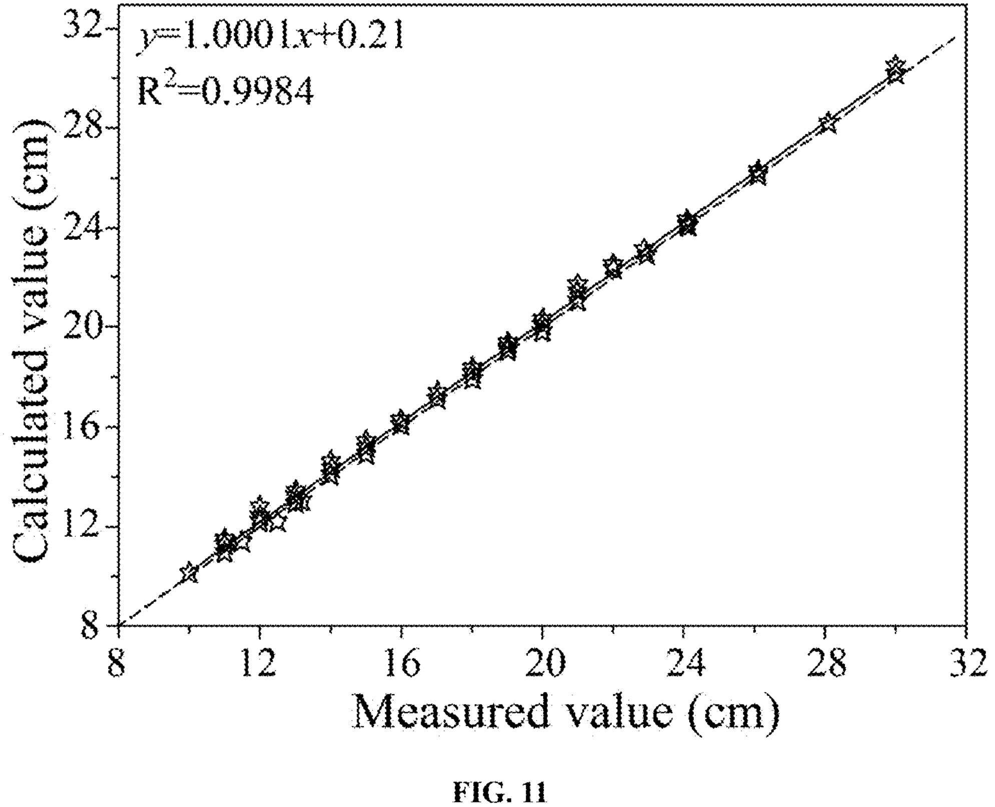
FIG. 11 is a schematic diagram of the comparison between a calculated value and a measured value of a channel water level based on bionic eagle-eye vision according to the present disclosure.

FIG. 11 is a schematic diagram of the comparison between a calculated value and a measured value of a channel water level based on bionic eagle-eye vision according to this embodiment. Referring to FIG. 11, it can be seen that the method for measuring channel flow based on bionic eagle-eye vision according to this embodiment is high in measurement accuracy.

Figure 12:
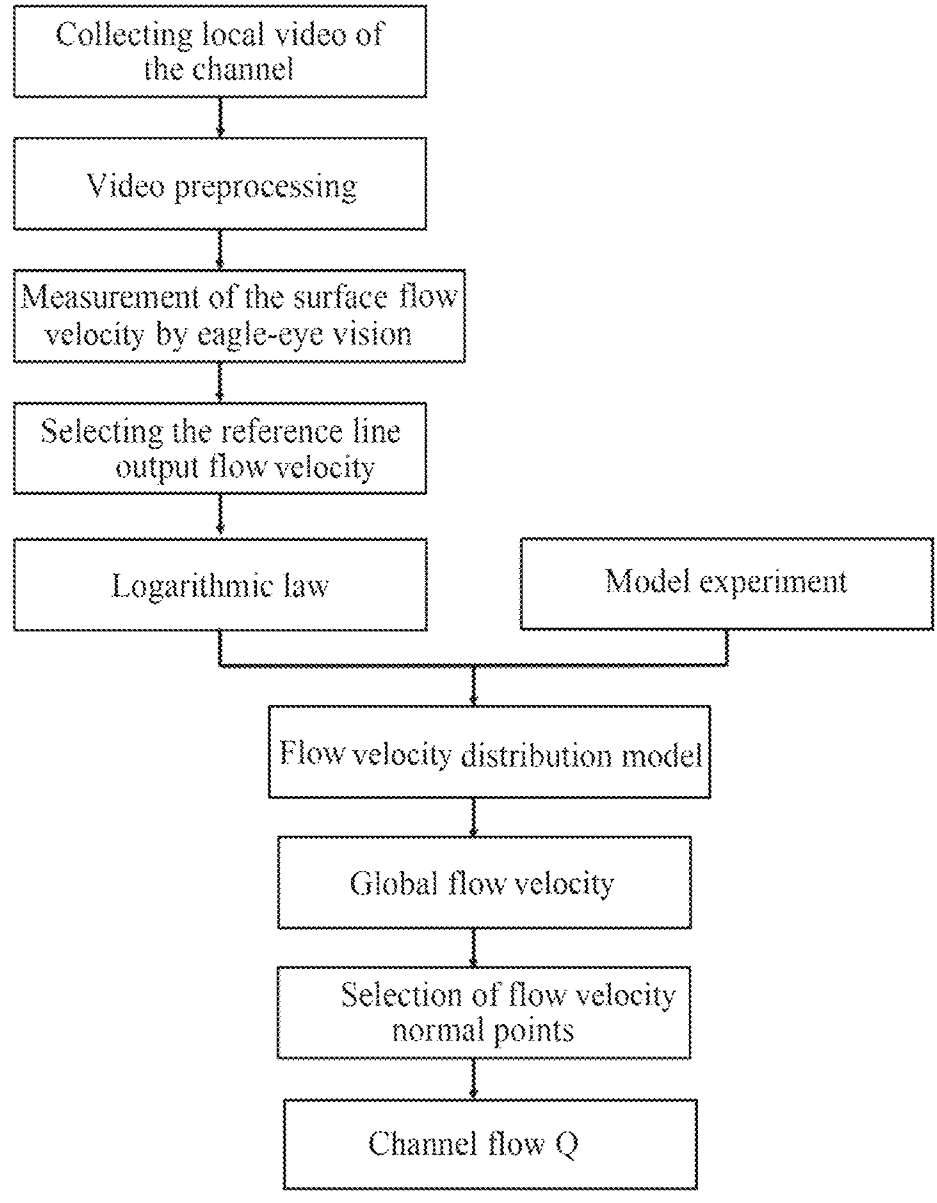
FIG. 12 is a complete flow chart of a method for measuring channel flow based on bionic eagle-eye vision according to the present disclosure.

FIG. 12 is a complete flow chart of a method for measuring channel flow based on bionic eagle-eye vision according to the embodiment of the present disclosure. As shown in FIG. 12, the complete flow chart of the method for measuring channel flow based on bionic eagle-eye vision according to the embodiment of the present disclosure is illustrated.

According to the analysis of the flow velocity distribution law of feature points, a logarithmic formula is selected to fit the flow velocity distribution formula of the trapezoidal channel. The flow velocity distribution formula suitable for the flow velocity distribution law from the center point to the side wall is initially established, and the correlation coefficient is determined through the experimental data. Furthermore, the mid-vertical line flow velocity distribution formula of the initial trapezoidal channel is verified. If the verification is successful, the surface cross-section flow velocity coupling model of the trapezoidal channel is obtained.

The embodiment of the present disclosure further provides an intelligent flow measurement model apparatus, which includes a solar panel, a monocular camera, an electric pole, an equipment installation box, a display screen and a cable. The apparatus can measure the flow velocity of the channel under different hydraulic conditions according to the real flow velocity distribution of the channel surface, thereby simplifying the flow measurement process, having a small error and effectively improving the measurement accuracy and efficiency.

The specific implementation process includes: first, collecting the flow velocity video of the wide and shallow channels, then inputting the video into the optical flow model to obtain the flow velocity below the reference line, measuring the flow velocity below the reference line using a current meter, and comparing the value measured by the optical flow model and the value measured by the current meter, to obtain the correlation coefficient that is 95%. And the result is shown in FIG. 5. Thereafter, the flow velocity distribution formula is obtained as follows by fitting according to the surface flow velocity of the collected video:

$$u = 0.4058\ln(y) + 3.7983$$

The flow velocity of seven points (0.4, 0.37, 0.34, 0.31, 0.28, 0.25, 0.21) on the mid-vertical line is measured by the current meter, and the expression which is the same as the above flow velocity distribution formula is obtained by fitting according to the measured data. The surface cross-section flow velocity coupling model is established, and the fitting result is shown in FIG. 6.

At the same time, the global flow velocity of the reference line is calculated by using the flow velocity distribution formula obtained by the local flow velocity, and the relative error calculation can be used to obtain:

$$e = \frac{|\text{real measured flow velocity} - \text{predicted flow velocity by the optical flow method}|}{\text{real measured flow velocity}} \times 100\%$$

where the real measured flow velocity refers to the flow velocity displayed by the current meter in the experiment, and the predicted flow velocity by the optical flow method is the result calculated by the flow velocity distribution formula, which is obtained by fitting the flow velocities predicted by the optical flow method. Continuing to refer to FIG. 8, the data actually measured by the reference line are close to the data calculated by using the distribution formula, and the relative errors are all within 10%, which indicates that the channel flow velocity distribution formula can accurately describe the global real flow velocity distribution.

In the specific implementation process, in order to verify the law between cross-section normals, eight cross-section normals are selected. The theoretical value (u) of the representative point of the normal flow velocity is used as the ordinate, and the logarithmic value (hx) of the distance from the representative point to the bottom of the channel is used as the abscissa, as shown in FIG. 7. The flow velocity distribution formula of each normal in the cross-section has the same slope and different intercepts.

The steps of the method for measuring channel flow based on bionic eagle-eye vision according to this embodiment are described above. As can be seen from the description of the above steps, the method for measuring channel flow based on bionic eagle-eye vision according to this embodiment includes: acquiring a channel flowing video, and carrying out image frame interval extraction on the channel flowing video to obtain a target observation image; calculating an optical flow value of the target observation image, and calculating a surface flow velocity value of the target observation image in a world coordinate system based on position change information of the optical flow value of the target observation image between image frames and a spatial resolution of the target observation image; wherein the position change information is used for indicating the change of a pixel point in the target observation image in a time domain; acquiring an average cross-section flow velocity based on a pre-trained surface cross-section flow velocity coupling model, and calculating the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance. Therefore, according to the present disclosure, the local channel flowing video is collected to infer the global area, so as to acquire the average cross-section flow velocity. Moreover, the channel flow is calculated according to the average cross-section flow velocity. The method is simple and the measurement accuracy is high.

The apparatus for measuring channel flow based on bionic eagle-eye vision according to the present disclosure is described hereinafter. The apparatus for measuring channel flow based on bionic eagle-eye vision described hereinafter and the method for measuring channel flow based on bionic eagle-eye vision described above can refer to each other correspondingly.

Figure 13:
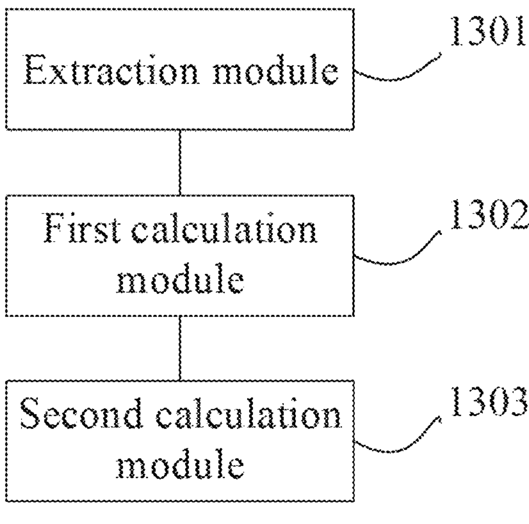
FIG. 13 is a schematic structural diagram of an apparatus for measuring channel flow based on bionic eagle-eye vision according to the present disclosure.

FIG. 13 is a schematic structural diagram of an apparatus for measuring channel flow based on bionic eagle-eye vision according to this embodiment. As shown in FIG. 13, the apparatus for measuring channel flow based on bionic eagle-eye vision according to this embodiment includes an extraction module 1301, a first calculation module 1302, and a second calculation module 1303.

The extraction module 1301 is configured to acquire a channel flowing video, and carry out image frame interval extraction on the channel flowing video to obtain a target observation image.

The first calculation module 1302 is configured to calculate an optical flow value of the target observation image, and calculate a surface flow velocity value of the target observation image in a world coordinate system based on position change information of the optical flow value of the target observation image between image frames and a spatial resolution of the target observation image; wherein the position change information is used for indicating the change of a pixel point in the target observation image in a time domain.

The second calculation module 1303 is configured to acquire an average cross-section flow velocity based on a pre-trained surface cross-section flow velocity coupling model, and calculate the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance.

The present disclosure provides an apparatus for measuring channel flow based on bionic eagle-eye vision, which includes: acquiring a channel flowing video, and carrying out image frame interval extraction on the channel flowing video to obtain a target observation image; calculating an optical flow value of the target observation image, and calculating a surface flow velocity value of the target observation image in a world coordinate system based on position change information of the optical flow value of the target observation image between image frames and a spatial resolution of the target observation image; wherein the position change information is used for indicating the change of a pixel point in the target observation image in a time domain; acquiring an average cross-section flow velocity based on a pre-trained surface cross-section flow velocity coupling model, and calculating the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance. Therefore, according to the present disclosure, the local channel flowing video is collected to infer the global area, so as to acquire the average cross-section flow velocity. Moreover, the channel flow is calculated according to the average cross-section flow velocity. The method is simple and the measurement accuracy is high.

Based on the above embodiment, in this embodiment, the extraction module 1301 is specifically configured to:

carry out image frame interval extraction and image enhancement preprocessing on the channel flowing video to obtain an initial observation image; and carry out background segmentation processing on the initial observation image to obtain the target observation image.

Based on the above embodiment, in this embodiment, the first calculation module 1302 is specifically configured to:

calculate an optical flow value of the target observation image, and calculate a surface flow velocity value of the target observation image in a pixel coordinate system based on position change information of the optical flow value of the target observation image between image frames; and calculate a surface flow velocity value of the target observation image in a world coordinate system based on a spatial resolution of the target observation image and a surface flow velocity value of the target observation image in a pixel coordinate system.

Based on the above embodiment, in this embodiment, the apparatus further includes a fitting module, which is specifically configured to:

before acquiring an average cross-section flow velocity based on a pre-trained surface cross-section flow velocity coupling model, determine an optimal frame image and a reference line position in the target observation image based on the surface flow velocity value in the world coordinate system; and obtain a local channel flow field based on the optimal frame image and the reference line position, and carry out flow velocity fitting on the local channel flow field to obtain a flow velocity distribution formula.

Based on the above embodiment, in this embodiment, the second calculation module 1303 is specifically configured to:

determine a plurality of target normal points based on the reference line position, and segment a channel using a plurality of vertical lines where the plurality of target normal points are located as axes of symmetry of a segmenting plane; and calculate an average flow velocity for each vertical line based on the surface cross-section flow velocity coupling model, and carry out calculation on the average flow velocity for each vertical line by using a weighted average method to obtain the average cross-section flow velocity.

Based on the above embodiment, in this embodiment, the apparatus further includes a training module, which is specifically configured to:

before calculating the channel flow based on the average cross-section flow velocity and a cross-section water level value, acquire a historical water area shoreline video, and splice and integrate images extracted from the historical water area shoreline video to obtain a historical water area shoreline image; and train a bionic eagle-eye vision model through the historical water area shoreline image to obtain a water level identification model; wherein the water level identification model includes a backbone network and a neck network, the backbone network is configured to extract feature information in the water area shoreline image and provide the feature information to the neck network, and the neck network is configured to carry out feature fusion on the feature information.

Based on the above embodiment, in this embodiment, the apparatus further includes an acquisition module, which is specifically configured to:

before calculating the channel flow based on the average cross-section flow velocity and a cross-section water level value, acquire a water area shoreline video, and input the water area shoreline video into the water level identification model to obtain the cross-section water level value.

Figure 14:
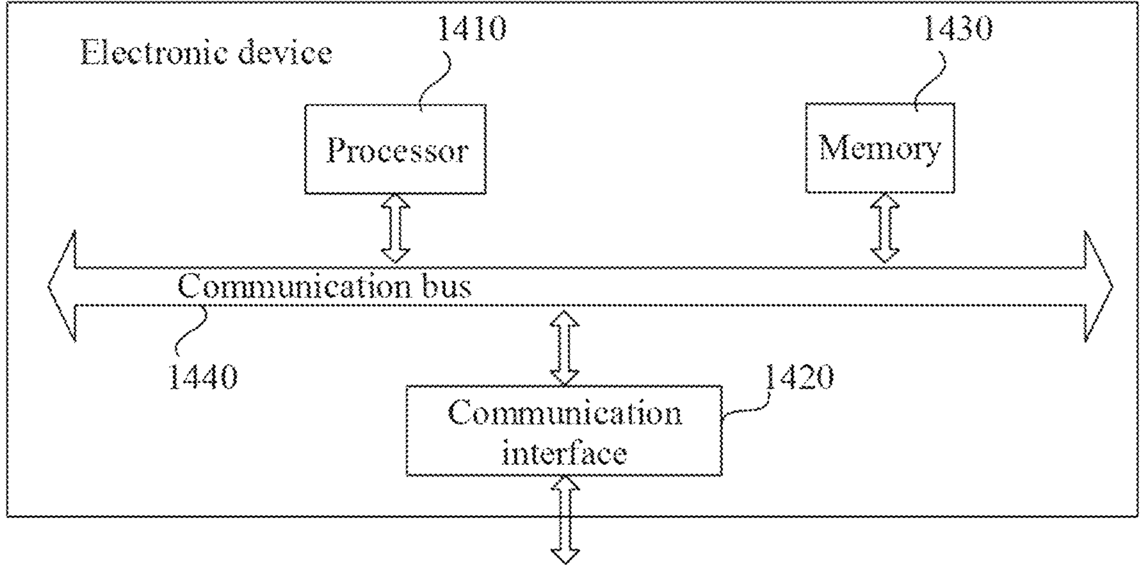
FIG. 14 is a schematic structural diagram of an electronic device according to the present disclosure.

FIG. 14 is a schematic diagram of a physical structure of an electronic device. As shown in FIG. 14, the electronic device may include a processor 1410, a communication interface 1420, a memory 1430 and a communication bus 1440. The processor 1410, the communication interface 1420 and the memory 1430 are communicated with each other through the communication bus 1440. The processor 1410 can call logic instructions in the memory 1430 to execute a method for measuring channel flow based on bionic eagle-eye vision, including:

acquiring a channel flowing video, and carrying out image frame interval extraction on the channel flowing video to obtain a target observation image;

calculating an optical flow value of the target observation image, and calculating a surface flow velocity value of the target observation image in a world coordinate system based on position change information of the optical flow value of the target observation image between image frames and a spatial resolution of the target observation image; wherein the position change information is used for indicating the change of a pixel point in the target observation image in a time domain; and acquiring an average cross-section flow velocity based on a pre-trained surface cross-section flow velocity coupling model, and calculating the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance.

In addition, the above-mentioned logical instructions in the memory 1430 can be realized in the form of software functional units and can be stored in a computer-readable storage medium when they are sold or used as independent products. Based on this understanding, the essence of the technical scheme of the present disclosure, or the part of the technical scheme that contributes to the prior art, or the part of the technical scheme, can be embodied in the form of a software product. The computer software product is stored in a storage medium, and includes several instructions to cause a computer apparatus (which may be a personal computer, a server, a network apparatus, etc.) to execute all or part of the steps of the method described in various embodiments of the present disclosure. The aforementioned storage medium includes various media that can store program codes, such as a USB flash drive, a mobile hard disk, a Read-Only Memory (ROM), a Random Access Memory (RAM), a magnetic disk or an optical disk.

In another aspect, the present disclosure further provides a computer program product, including a computer program which may be stored on a non-transient computer-readable storage medium, wherein the computer program, when executed by a processor, may implement the method for measuring channel flow based on bionic eagle-eye vision provided by the above methods. The method includes: acquiring a channel flowing video, and carrying out image frame interval extraction on the channel flowing video to obtain a target observation image;

calculating an optical flow value of the target observation image, and calculating a surface flow velocity value of the target observation image in a world coordinate system based on position change information of the optical flow value of the target observation image between image frames and a spatial resolution of the target observation image; wherein the position change information is used for indicating the change of a pixel point in the target observation image in a time domain; and acquiring an average cross-section flow velocity based on a pre-trained surface cross-section flow velocity coupling model, and calculating the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance.

In still another aspect, the present disclosure further provides a non-transient computer-readable storage medium on which a computer program is stored, wherein the computer program, when executed by a processor, implements the method for measuring channel flow based on bionic eagle-eye vision provided by the above methods. The method includes:

acquiring a channel flowing video, and carrying out image frame interval extraction on the channel flowing video to obtain a target observation image;

calculating an optical flow value of the target observation image, and calculating a surface flow velocity value of the target observation image in a world coordinate system based on position change information of the optical flow value of the target observation image between image frames and a spatial resolution of the target observation image; wherein the position change information is used for indicating the change of a pixel point in the target observation image in a time domain; and acquiring an average cross-section flow velocity based on a pre-trained surface cross-section flow velocity coupling model, and calculating the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated based on a water area shoreline image acquired in advance.

The apparatus embodiments described above are only schematic, in which the units described as separate components may or may not be physically separated. The components displayed as units may or may not be physical units, that is, the components may be located in one place or distributed to a plurality of network units. Some or all of the modules can be selected according to actual needs to achieve the purpose of this embodiment. Those skilled in the art can understand and implement the purpose without creative labor.

From the description of the above embodiments, those skilled in the art can clearly understand that each embodiment can be realized by means of a software plus necessary general hardware platform, and of course can also be realized by hardware. Based on this understanding, the essence of the above technical scheme or the part of the technical scheme that contributes to the prior art can be embodied in the form of a software product. The computer software product can be stored in a storage medium, such as an ROM/RAM, a magnetic disk, an optical disk, etc., and includes several instructions to cause a computer apparatus (which may be a personal computer, a server, a network apparatus, etc.) to execute the methods described in various embodiments or some parts of the embodiments.

Finally, it should be explained that the above embodiments are only used to illustrate the technical scheme of the present disclosure, rather than limit the technical scheme. Although the present disclosure has been described in detail with reference to the above embodiments, those skilled in the art should understand that it is still possible to modify the technical schemes described in the above embodiments, or to substitute some technical features with equivalents. However, these modifications or substitutions do not cause the essence of the corresponding technical schemes to deviate from the spirit and the scope of the technical schemes of various embodiments of the present disclosure.

What is claimed is:

1. A method for measuring channel flow based on bionic eagle-eye vision, comprising:

acquiring a channel flowing video, and carrying out image frame interval extraction on the channel flowing video to obtain a target observation image, wherein the bionic eagle-eye vision collects the channel flowing video by simulating a central fovea structure on an eagle-eye side using a binocular camera;

calculating an optical flow value of the target observation image, and calculating a surface flow velocity value of the target observation image in a world coordinate system based on position change information of the optical flow value of the target observation image between image frames and a spatial resolution of the target observation image, wherein the position change information is used for indicating a change of a pixel point in the target observation image in a time domain; and acquiring an average cross-section flow velocity based on a pre-trained surface cross-section flow velocity coupling model, and calculating the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated through a water level identification model based on a water area shoreline image acquired in advance, wherein the water level identification model is obtained by training based on a bionic eagle-eye vision model, and the water level identification model comprises a backbone network and a neck network, the backbone network is configured to extract feature information in the water area shoreline image and provide the feature information to the neck network, and the neck network is configured to carry out feature fusion on the feature information;

wherein the method further comprises: before the acquiring an average cross-section flow velocity based on a pre-trained surface cross-section flow velocity coupling model, determining an optimal frame image and a reference line position in the target observation image based on the surface flow velocity value in the world coordinate system; and obtaining a local channel flow field based on the optimal frame image and the reference line position, and carrying out flow velocity fitting on the local channel flow field to obtain a flow velocity distribution formula.

2. The method according to claim 1, wherein the carrying out image frame interval extraction on the channel flowing video to obtain a target observation image comprises:

carrying out the image frame interval extraction and image enhancement preprocessing on the channel flowing video to obtain an initial observation image; and carrying out background segmentation processing on the initial observation image to obtain the target observation image.

3. The method according to claim 1, wherein the calculating an optical flow value of the target observation image, and calculating a surface flow velocity value of the target observation image in a world coordinate system based on position change information of the optical flow value of the target observation image between image frames and a spatial resolution of the target observation image, comprises:

calculating the optical flow value of the target observation image, and calculating a surface flow velocity value of the target observation image in a pixel coordinate system based on the position change information of the optical flow value of the target observation image between the image frames; and calculating the surface flow velocity value of the target observation image in the world coordinate system based on the spatial resolution of the target observation image and the surface flow velocity value of the target observation image in the pixel coordinate system.

4. The method according to claim 1, wherein the acquiring an average cross-section flow velocity based on a pre-trained surface cross-section flow velocity coupling model comprises:

determining a plurality of target normal points based on the reference line position, and segmenting a channel using a plurality of vertical lines where the plurality of target normal points are located as axes of symmetry of a segmenting plane; and calculating an average flow velocity for each vertical line based on the surface cross-section flow velocity coupling model, and carrying out calculation on the average flow velocity for each vertical line by using a weighted average method to obtain the average cross-section flow velocity.

5. The method according to claim 1, further comprising: before the calculating the channel flow based on the average cross-section flow velocity and a cross-section water level value, acquiring a historical water area shoreline video, and splicing and integrating images extracted from the historical water area shoreline video to obtain a historical water area shoreline image; and training the bionic eagle-eye vision model through the historical water area shoreline image to obtain the water level identification model; wherein the water level identification model comprises the backbone network and the neck network, the backbone network is configured to extract the feature information in the water area shoreline image and provide the feature information to the neck network, and the neck network is configured to carry out the feature fusion on the feature information.

6. The method according to claim 4, further comprising: before the calculating the channel flow based on the average cross-section flow velocity and a cross-section water level value, acquiring a water area shoreline video, and inputting the water area shoreline video into the water level identification model to obtain the cross-section water level value.

7. An apparatus for measuring channel flow based on bionic eagle-eye vision, comprising:

an extraction module, configured to acquire a channel flowing video, and carry out image frame interval extraction on the channel flowing video to obtain a target observation image, wherein the bionic eagle-eye vision collects the channel flowing video by simulating a central fovea structure on an eagle-eye side using a binocular camera;

a first calculation module, configured to calculate an optical flow value of the target observation image, and calculate a surface flow velocity value of the target observation image in a world coordinate system based on position change information of the optical flow value of the target observation image between image frames and a spatial resolution of the target observation image, wherein the position change information is used for indicating a change of a pixel point in the target observation image in a time domain; and a second calculation module, configured to acquire an average cross-section flow velocity based on a pre-trained surface cross-section flow velocity coupling model, and calculate the channel flow based on the average cross-section flow velocity and a cross-section water level value; wherein the surface cross-section flow velocity coupling model is obtained by fitting the surface flow velocity value in the world coordinate system based on a flow velocity distribution formula, constructing a surface flow velocity distribution law and a mid-vertical line flow velocity distribution law, and training according to the surface flow velocity distribution law and the mid-vertical line flow velocity distribution law; and the cross-section water level value is calculated through a water level identification model based on a water area shoreline image acquired in advance wherein the water level identification model is obtained by training based on a bionic eagle-eye vision model, and the water level identification model comprises a backbone network and a neck network, the backbone network is configured to extract feature information in the water area shoreline image and provide the feature information to the neck network, and the neck network is configured to carry out feature fusion on the feature information;

wherein the apparatus further comprises a fitting module configured to:

before the acquiring an average cross-section flow velocity based on a pre-trained surface cross-section flow velocity coupling model, determine an optimal frame image and a reference line position in the target observation image based on the surface flow velocity value in the world coordinate system; and obtain a local channel flow field based on the optimal frame image and the reference line position, and carry out flow velocity fitting on the local channel flow field to obtain a flow velocity distribution formula.

8. An electronic device, comprising:

a memory, a processor, and a computer program, stored in the memory and executable on the processor, wherein the processor, when executing the computer program, implements the method according to claim 1.

9. A non-transitory computer-readable storage medium, having a computer program stored therein, wherein the computer program, when executed by a processor, implements the method according to claim 1.

10. The electronic device according to claim 8, wherein the carrying out image frame interval extraction on the channel flowing video to obtain a target observation image comprises:

carrying out the image frame interval extraction and image enhancement preprocessing on the channel flowing video to obtain an initial observation image; and carrying out background segmentation processing on the initial observation image to obtain the target observation image.

11. The electronic device according to claim 8, wherein the calculating an optical flow value of the target observation image, and calculating a surface flow velocity value of the target observation image in a world coordinate system based on position change information of the optical flow value of the target observation image between image frames and a spatial resolution of the target observation image, comprises:

calculating the optical flow value of the target observation image, and calculating a surface flow velocity value of the target observation image in a pixel coordinate system based on the position change information of the optical flow value of the target observation image between the image frames; and calculating the surface flow velocity value of the target observation image in the world coordinate system based on the spatial resolution of the target observation image and the surface flow velocity value of the target observation image in the pixel coordinate system.

12. The electronic device according to claim 8, wherein the acquiring an average cross-section flow velocity based on a pre-trained surface cross-section flow velocity coupling model comprises:

determining a plurality of target normal points based on the reference line position, and segmenting a channel using a plurality of vertical lines where the plurality of target normal points are located as axes of symmetry of a segmenting plane; and calculating an average flow velocity for each vertical line based on the surface cross-section flow velocity coupling model, and carrying out calculation on the average flow velocity for each vertical line by using a weighted average method to obtain the average cross-section flow velocity.

13. The electronic device according to claim 8, wherein the method further comprises: before the calculating the channel flow based on the average cross-section flow velocity and a cross-section water level value, acquiring a historical water area shoreline video, and splicing and integrating images extracted from the historical water area shoreline video to obtain a historical water area shoreline image; and training the bionic eagle-eye vision model through the historical water area shoreline image to obtain the water level identification model; wherein the water level identification model comprises the backbone network and the neck network, the backbone network is configured to extract the feature information in the water area shoreline image and provide the feature information to the neck network, and the neck network is configured to carry out the feature fusion on the feature information.

14. The electronic device according to claim 13, wherein the method further comprises: before the calculating the channel flow based on the average cross-section flow velocity and a cross-section water level value, acquiring a water area shoreline video, and inputting the water area shoreline video into the water level identification model to obtain the cross-section water level value.

15. The non-transitory computer-readable storage medium according to claim 9, wherein the carrying out image frame interval extraction on the channel flowing video to obtain a target observation image comprises:

carrying out the image frame interval extraction and image enhancement preprocessing on the channel flowing video to obtain an initial observation image; and carrying out background segmentation processing on the initial observation image to obtain the target observation image.

16. The non-transitory computer-readable storage medium according to claim 9, wherein the calculating an optical flow value of the target observation image, and calculating a surface flow velocity value of the target observation image in a world coordinate system based on position change information of the optical flow value of the target observation image between image frames and a spatial resolution of the target observation image, comprises:

calculating the optical flow value of the target observation image, and calculating a surface flow velocity value of the target observation image in a pixel coordinate system based on the position change information of the optical flow value of the target observation image between the image frames; and calculating the surface flow velocity value of the target observation image in the world coordinate system based on the spatial resolution of the target observation image and the surface flow velocity value of the target observation image in the pixel coordinate system.

17. The non-transitory computer-readable storage medium according to claim 9, wherein the acquiring an average cross-section flow velocity based on a pre-trained surface cross-section flow velocity coupling model comprises:

determining a plurality of target normal points based on the reference line position, and segmenting a channel using a plurality of vertical lines where the plurality of target normal points are located as axes of symmetry of a segmenting plane; and calculating an average flow velocity for each vertical line based on the surface cross-section flow velocity coupling model, and carrying out calculation on the average flow velocity for each vertical line by using a weighted average method to obtain the average cross-section flow velocity.

18. The non-transitory computer-readable storage medium according to claim 9, wherein the method further comprises: before the calculating the channel flow based on the average cross-section flow velocity and a cross-section water level value, acquiring a historical water area shoreline video, and splicing and integrating images extracted from the historical water area shoreline video to obtain a historical water area shoreline image; and training the bionic eagle-eye vision model through the historical water area shoreline image to obtain the water level identification model; wherein the water level identification model comprises the backbone network and the neck network, the backbone network is configured to extract the feature information in the water area shoreline image and provide the feature information to the neck network, and the neck network is configured to carry out the feature fusion on the feature information.

19. The non-transitory computer-readable storage medium according to claim 18, wherein the method further comprises: before the calculating the channel flow based on the average cross-section flow velocity and a cross-section water level value, acquiring a water area shoreline video, and inputting the water area shoreline video into the water level identification model to obtain the cross-section water level value.

* * * * *